(12) United States Patent
Tseng

(10) Patent No.: US 6,765,480 B2
(45) Date of Patent: Jul. 20, 2004

(54) MONOCULAR COMPUTER VISION AIDED ROAD VEHICLE DRIVING FOR SAFETY

(76) Inventor: Din-Chang Tseng, No. 119, Choun-Da New Village, Choun-Li, 320, Tao-Yuan Shien (TW)

( * ) Notice: Subject to any disclaimer, the term of this patent is extended or adjusted under 35 U.S.C. 154(b) by 22 days.

(21) Appl. No.: 10/119,066

(22) Filed: Apr. 10, 2002

(65) Prior Publication Data

US 2003/0030546 A1 Feb. 13, 2003

(30) Foreign Application Priority Data

Jul. 12, 2001 (TW) .......................... 90117029 A

(51) Int. Cl.$^7$ .............................. G08G 1/16; G06K 9/46; H04N 7/00; G01O 22/00; G06G 7/78
(52) U.S. Cl. ................... 340/425.5; 340/903; 382/104; 382/286; 382/291; 348/119; 701/28; 701/96; 701/301
(58) Field of Search ............................ 340/435, 903; 382/106, 107, 104, 286, 291; 701/301, 96, 28; 348/119, 118

(56) References Cited

U.S. PATENT DOCUMENTS

| | | | | |
|---|---|---|---|---|
| 4,931,937 A | * | 6/1990 | Kakinami et al. ......... 701/300 |
| 4,970,653 A | * | 11/1990 | Kenue ........................ 701/301 |
| 5,230,400 A | * | 7/1993 | Kakinami et al. .......... 180/169 |
| 5,555,312 A | * | 9/1996 | Shima et al. ............... 382/104 |
| 5,555,555 A | * | 9/1996 | Sato et al. .................. 382/104 |
| 5,790,403 A | * | 8/1998 | Nakayama ................... 701/28 |
| 6,245,422 B1 | * | 6/2001 | Onishi et al. ............... 348/119 |
| 6,285,393 B1 | * | 9/2001 | Shimoura et al. ........... 348/119 |
| 6,535,114 B1 | * | 3/2003 | Suzuki et al. ............... 340/435 |
| 2002/0031242 A1 | * | 3/2002 | Yasui et al. ................. 382/104 |
| 2002/0134151 A1 | * | 9/2002 | Naruoka et al. .............. 73/291 |

\* cited by examiner

Primary Examiner—Jeffery Hofsass
Assistant Examiner—Anne V. Lai
(74) Attorney, Agent, or Firm—Bacon & Thomas, PLLC

(57) ABSTRACT

The present invention is a monocular computer vision technique. The technique is used to aid road vehicle driving for safety. An camera (e.g., camera or TV camera or camcorder) is installed in a vehicle facing to the road in front of the vehicle to capture a sequence of road/scene images for analyzing the driving situation. The situation includes the distance to a front obstacle or vehicle, the speed of the vehicle, and the left/right location of the vehicle in a road lane.

4 Claims, 5 Drawing Sheets

MONOCULAR COMPUTER VISION AIDED ROAD VEHICLE DRIVING FOR SAFETY

FIELD OF THE INVENTION

Figure 1:
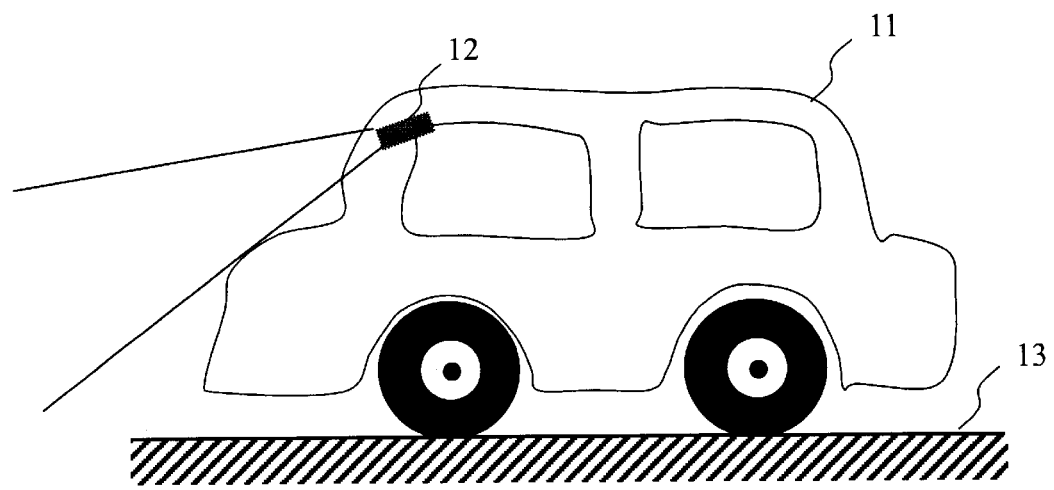
Figure 1:
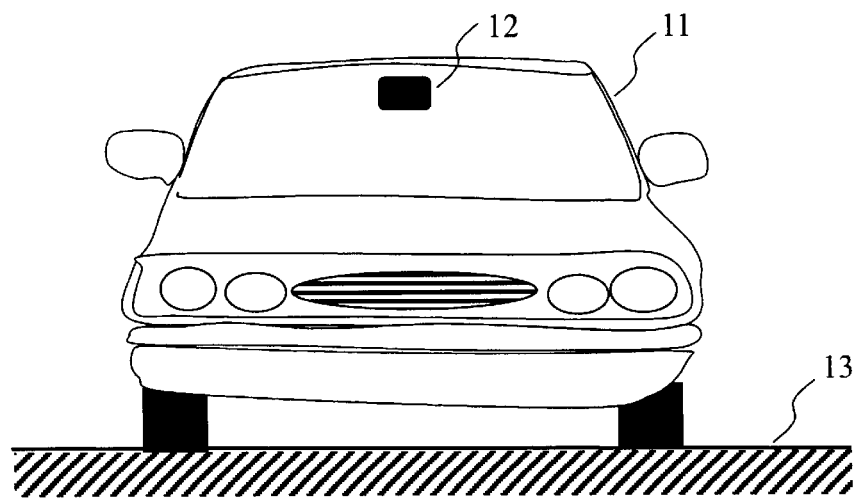

The present invention is a monocular computer vision technique. The technique is used to aid road vehicle driving for safety. A camera (e.g., camera or camcorder) is installed in a vehicle facing to the road in front of the vehicle to capture a sequence of road/scene images for analyzing the driving situation. The situation includes the distance to a front obstacle or vehicle, the speed of the vehicle, and the left/right location of the vehicle in a road lane. If a danger situation is arisen, the sound and/or light alarm will arise to warn the driver for safety.

BACKGROUND OF THE INVENTION

Safe traffic is important to the property of an individual and the stability of human society. Driving a car out to work or travel is trivial nowadays. Sometimes, persons lose their attention during driving a car; especially, for a long-distance or a high-speed driving, many danger situations are then arisen. If there is a mechanism to alarm the driver and provide some useful information to judge by the driver in these situations, the danger is therefore avoided.

Several techniques have been proposed for the purposes of safe driving. In most previous proposed techniques, an ultrasonic range finder or laser radar was equipped on a car to detect the obstacles in front of the car. The equipments are expensive, have only a special function, and are not easily used. Other techniques had equipped a pair of cameras on a car and then utilized the stereo vision method to guide the navigation; however, this vision system is still complicated, working slowly, and expensive. If we can only equip a camera to detect the obstacles in front of the car and to guide the navigation, the vision system will be simpler, cheaper, and easy to practice for safe driving.

The left/right location of a vehicle in a road lane is also important to the driver during driving on a road; especially for that the driver can't concentrate his/her attention on the driving. To the detection of the left/right location in a lane, someone had proposed a method by equipping one camera on each side of the car to detect lines on both sides of the current lane; however, such equipments are still complicated and more expensive. It had better detect the left/right location of a vehicle in a road lane only using a camera.

THE PURPOSES OF THE INVENTION

The present invention is used for aiding road vehicle driving to improve the driving safety, to reduce the traffic accident, and to avoid the loss of lives and property. The invention technique only installs a camera in a vehicle facing to the front of the vehicle to capture a sequence of road/scene images, then utilizes the monocular computer vision method to acquire the driving situation. The situation includes the distance to a front obstacle or vehicle, the speed of the vehicle, and the left/right location of the vehicle in a road lane.

BRIEF EXPLANATION

In order to attach the mentioned purposes, the present invention proposes a monocular computer vision technique to aid road vehicle driving for safety. The invention technique only installs a camera in a vehicle facing to the front of the vehicle and then processes the following steps:

i. using the camera to capture a sequence of road/scene images;
  ii. processing and analyzing the sequence of images using the monocular computer vision method; and
  iii. acquiring the driving situation for the vehicle based on the analysis results of the computer vision method.

As the described monocular computer vision technique for aiding road vehicle driving, the camera is a camera, TV camera, digital camera, camcorder, or digital camcorder. The capture device connects a computer and directly transmits the captured images or video into the computer for computer vision analysis.

As the described monocular computer vision technique for aiding road vehicle driving, the vehicle is a car, bus, or truck.

As the described monocular computer vision technique for aiding road vehicle driving, the camera is fixed on the front of a vehicle, the device is facing to the road in front of the vehicle, and the contents of the images are the road and scene in front of the vehicle.

As the described monocular computer vision technique for aiding road vehicle driving, the procedure for the monocular computer vision method contains:

i. detecting the distance to a front obstacle or vehicle by analyzing the image sequence;
  ii. estimating the vehicle speed based on a continuous image sub-sequence of the sequence; and
  iii. determining the left/right location of the vehicle in the current lane.

As the described monocular computer vision technique for aiding road vehicle driving, the detection of the distance to a front obstacle or vehicle consists of the following steps:

i. from each image to extract the lines on both sides of the current lane and then find the intersection of these two lines; the intersection point is just the vanishing point of the lane;
  ii. from the vanishing point and the known focal length of the camera lens to find the pitch and yaw angles of the lane lines with respect to the camera coordinate system;
  iii. from the pitch angle and the height of the camera to calculate the distance from the camera location to the point which is the intersection of the camera optical axis and the road plane;
  iv. from each image to find horizontal lines to indicate the intersections of the rear wheels of front vehicles and the road, select a nearest horizontal line that overlaps the current lane, and judge that the horizontal line is located above or below the image center;
  v. from the known camera focal length, camera height, pitch angle, and the vertical distance from the horizontal line to the image center to find the road distance from the camera location to the rear wheel of the front vehicle or obstacle.

As the described monocular computer vision technique for aiding road vehicle driving, the vehicle speed is computed based on the detection of the distance to a front vehicle. At first, a terminal point of a dashed lane line is found in any continuous image sub-sequence. For the images, the distances from the camera location to the terminal point are calculated respectively. The vehicle speed is just derived from the distance difference dividing by the time difference for the images.

As the described monocular computer vision technique for aiding road vehicle driving, the left/right location of the vehicle in a road lane is computed from the ratio of two distances which are from the midpoint of the image lower border to the intersection points of the extended image lower border and the two lines of the current lane.

As the described monocular computer vision technique for aiding road vehicle driving to acquire the driving situation, the situation includes the distance to a front obstacle or vehicle, the speed of the vehicle, and the left/right location of the vehicle in a road lane.

DETAILED EXPLANATION

FIG. 1. The diagram of the invention vision system. (a) Side view. (b) Front view.

Figure 2:
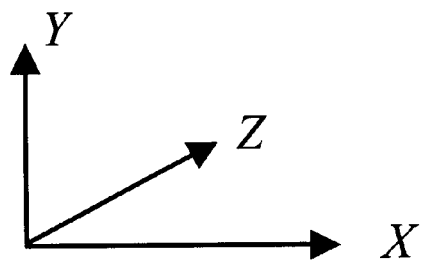
Figure 2:
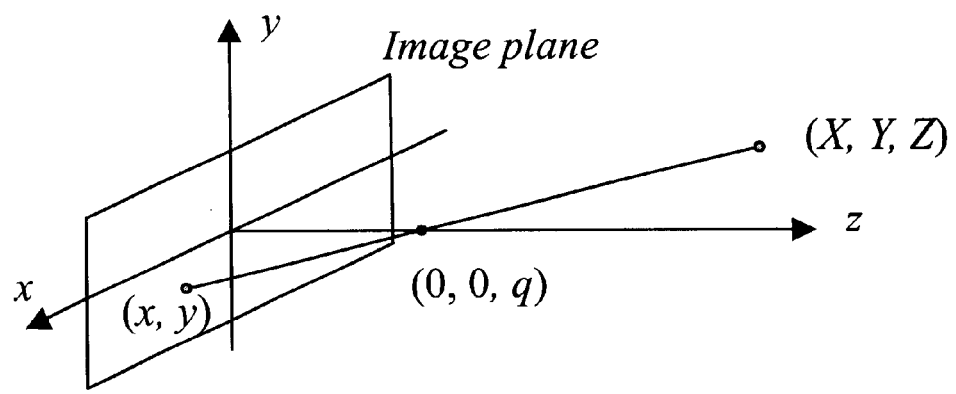

FIG. 2. The left-handed coordinate system and the camera coordinate system used in the proposal. (a) The left-handed coordinate system. (b) The camera coordinate system.

Figure 3:

FIG. 3. The image center point and a vanishing point.

Figure 4:
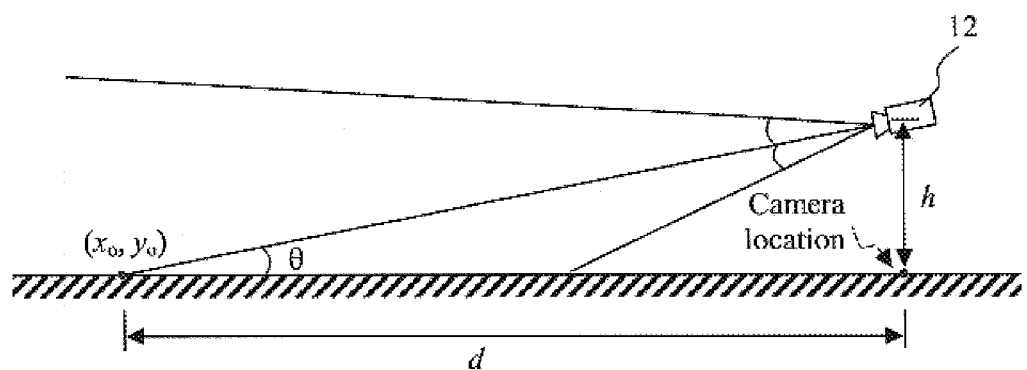

FIG. 4. The side view of the relationship between the camera and the road plane.

Figure 5:

FIG. 5. The horizontal lines in an image.

Figure 6:
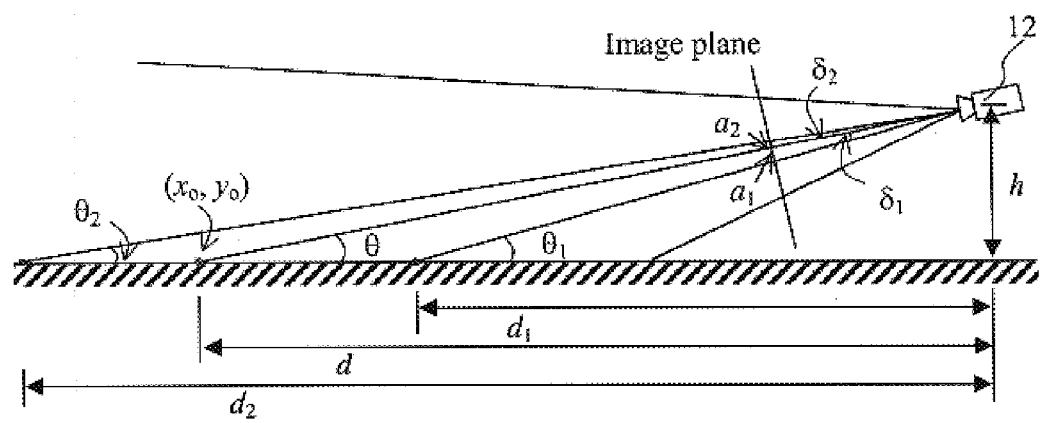

FIG. 6. The side view of the relationship between the camera and image horizontal lines.

Figure 7:
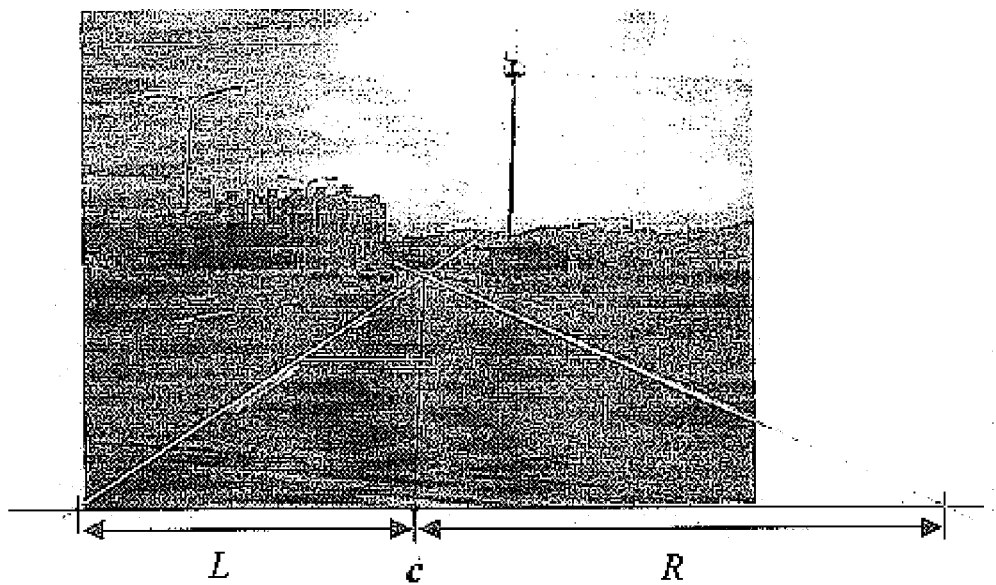

FIG. 7. The front view for indicating the right/left location of the vehicle in the current lane.

Figure 8:
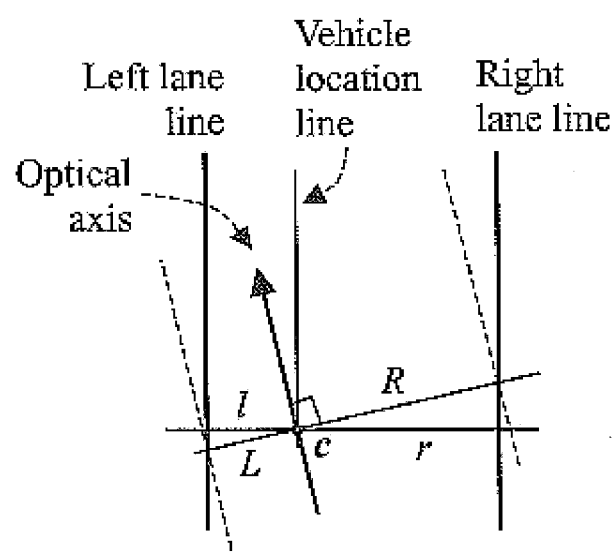

FIG. 8. The top view of a camera coordinate system in a lane.

| 11: vehicle | 12: camera | 13: road |
| --- | --- | --- |

The present invention installs an image capture device on the front of a vehicle as an artificial eye to capture a sequence of road/scene images for detecting the distance to a front obstacle or vehicle, estimating the speed of the vehicle, determining the left/right location of the vehicle in a road lane, and providing sound and/or light to warn the driver to aid the driver for safety.

FIG. 1 is the equipment diagram of the present invention. A vehicle 11 navigates on a road 13. A camera 12 is fixed near the center of the windshield and the upper border of the windshield; the camera faces to the road in front of the vehicle.

The theories and the formulas for the present invention techniques are detailedly described as follows:

A. Detecting the Distance to a Front Obstacle or Vehicle

We use the left-handed coordinate system to define the camera coordinate system and the world coordinate system as shown in FIG. 2. The rotation angle for the coordinate system is measured clockwise. The optical axis of the camera is defined as the z-axis of the camera coordinate system; the image is just the xy-plane of the camera coordinate system. The world coordinate system is just used for helping explanation of the proposed theory and we only care its orientation; thus only the direction of the coordinate system is defined. Assume the road being a plane. The world coordinate system is defined by the road plane and the lane lines of the current lane. Let the road plane be the XZ-plane of the world coordinate system and one lane line be the Z-axis of the world coordinate system.

Let $(x_o, y_o)$ be the coordinates of the image center and $(x_v, y_v)$ be the coordinates of the vanishing point of the current lane as shown in FIG. 3. According to the theory of vanishing point, the 3-dimensional direction of the lane lines with respect to the camera coordinate system is $(x_v, y_v, q)$, where q is the focal length of the camera lens. If the vanishing point is not located on the central vertical line of the image, the camera must have a yaw rotation to the world coordinate system. The contained angle $\phi'$ of Z-axis of the world coordinate system (i.e., the lane line) and x-axis of the camera coordinate system can be calculated by the formula $$\cos\phi' = \frac{[1\ 0\ 0]\cdot[x_v\ y_v\ q]}{\sqrt{x_v^2 + y_v^2 + q^2}}. \qquad (1)$$

The acute angle $\phi$ of the lane line and the yz-plane (i.e., the yaw angle of the camera coordinate system) is then calculated as $$\phi = 90° - \cos^{-1}\left(\frac{xv}{\sqrt{x_v^2 + y_v^2 + q^2}}\right). \qquad (2)$$

The positive $\phi$ means that the camera coordinate system turns left and the negative $\phi$ means to turn right. The component of the lane line on the yz-plane is $[0\ Y_v\ q]$, Thus the acute angle of the lane line and the camera optical axis (i.e., z-axis) on the yz-plane is $\theta$, $$\cos\theta = \frac{[0\ y_v\ q]\cdot[0\ 0\ 1]}{\sqrt{y_v^2 + q^2}} \Rightarrow \theta = \cos^{-1}\left(\frac{q}{\sqrt{y_v^2 + q^2}}\right). \qquad (3)$$

From Eqs.(2) and (3), we can find the pitch angle $\theta$ and yaw angle $\phi$ of the lane lines with respect to the camera coordinate system. There are something in the formulas should be cared: the units of the coordinates $[x_v, y_v]$ and q must be the same; the pixels in images may be not square pixels; thus the image should be calibrated before it is used for analysis.

The location under the camera and on the road is called the camera location. Assume the distance from the camera center to the camera location (i.e., the height of the camera) being h as shown in FIG. 4. If the camera location to the intersection point of the optical axis and the road plane is d, then by the relation of the right triangle, we have $$\frac{h}{d} = \tan\theta \Rightarrow d = h\cot\theta. \qquad (4)$$

Now we want to compute the distance from the camera location to the road position at which a horizontal line in the image indicates; examples are shown in FIG. 5.

Assume that a horizontal line is located below the image center with vertical distance $a_1$ as shown in FIG. 6. The road position of the horizontal line to the camera location is $d_1$, the view angle with respect to the optical axis is $\delta_1$; that is the view angle with respect to the road plane is $\theta_1$, $$\theta_1 - \theta = \delta_1. \qquad (5)$$

According to the relationship of a right triangle, $\delta_1$ can be computed for the formula $$\frac{a_1}{q} = \tan\delta_1 \Rightarrow \delta_1 = \tan^{-1}\left(\frac{a_1}{q}\right). \qquad (6)$$

Besides, from FIG. 6, we have $$d_1 = h \cot\theta_1. \qquad (7)$$

If we substitute Eqs.(5) and (6) into Eq.(7), we have $$d_1 = h\cot\theta_1 = h\cot(\theta + \delta_1) = h\cot\left(\theta + \tan^{-1}\left(\frac{a_1}{q}\right)\right). \quad (8)$$

In other words, the distance from the camera location to a road position at which a horizontal line in the image indicates can be computed from known camera height h, focal length q of the camera lens, the view angle θ of the optical axis with respect to the road plane, and the distance $a_1$ from the image center to the horizontal line. If the horizontal line indicates the intersection of the rear wheel of a front vehicle and the road plane, then we just find the distance to the front vehicle.

We can also derive other formulas to compute the distance to a front vehicle. The derivation is started from Eq.(6)

$$\frac{a_1}{q} = \tan\delta_1 \Rightarrow \cot\delta_1 = \frac{q}{a_1} \Rightarrow \cot(\theta_1 - \theta) = \frac{q}{a_1}. \quad (9)$$

From Eqs.(4) and (7), we have $$d - d_1 = h(\cot\theta - \cot\theta_1) = h\frac{\cot\theta\cot\theta_1 + 1}{\cot(\theta_1 - \theta)} \quad (10)$$

$$\Rightarrow d - d_1 = h\frac{\cot\theta\cot\theta_1 + 1}{\frac{q}{a_1}} = \frac{a_1 h}{q}(\cot\theta\cot\theta_1 + 1)$$

$$\Rightarrow d_1 = d - \frac{a_1 h}{q}(\cot\theta\cot\theta_1 + 1).$$

That is, the distance from the camera location to a road position at which a horizontal line in the image indicates can be computed from known camera height h, focal length q of the camera lens, the view angle θ of the optical axis with respect to the road plane, the distance $a_1$ from the image center to the horizontal line, the pitch angle θ of the camera, and the distance d from the camera location to the intersection point of the optical axis and the road plane.

With the same principle, a horizontal line is located above the image center with vertical distance $a_2$ as shown in FIG. 6 and the road position of the horizontal line to the camera location is $d_2$, then the view angles have the relation $$\theta - \theta_2 = \delta_2. \quad (11)$$

According to the relationship of the right triangle, view angle $\delta_2$ can be calculated by $$\frac{a_2}{q} = \tan\delta_2 \Rightarrow \delta_2 = \tan^{-1}\left(\frac{a_2}{q}\right). \quad (12)$$

Moreover, we have $$d_2 = h \cot\theta_2. \quad (13)$$

If we substitute Eqs.(11) and (12) into Eq.(13), we have $$d_2 = h\cot\theta_2 = h\cot(\theta - \delta_2) = h\cot\left(\theta - \tan^{-1}\left(\frac{a_2}{q}\right)\right). \quad (14)$$

With other derivation from Eq.(12), we have $$\frac{a_2}{q} = \tan\delta_2 \Rightarrow \cot\delta_2 = \frac{q}{a_2} \Rightarrow \cot(\theta - \theta_2) = \frac{q}{a_2}. \quad (15)$$

From Eqs.(4) and (13), we have $$d_2 - d = h(\cot\theta_2 - \cot\theta) = h\frac{\cot\theta\cot\theta_2 + 1}{\cot(\theta - \theta_2)} \quad (16)$$

$$\Rightarrow d_2 - d = h\frac{\cot\theta\cot\theta_2 + 1}{\frac{q}{a_2}} = \frac{a_2 h}{q}(\cot\theta\cot\theta_2 + 1)$$

$$\Rightarrow d_2 = d + \frac{a_2 h}{q}(\cot\theta\cot\theta_2 + 1).$$

The process steps based on the proposed theory are described as follows:

i. from an image to find a horizontal line to represent the touch location of the rear wheel of a front vehicle in the current lane and judge the line is located above or below the image center;

ii. extract the lines of the current lane and find the vanishing point $(x_v, y_v)$;

iii. from the vanishing point and the focal length q of the camera lens to find the pitch angle θ and yaw angle φ of the lane with respect to the camera coordinate system;

iv. from the pitch angle θ and the known camera height h to find the distance d using Eq:(4);

v. find the distance $a_1$ (or $a_2$) from image center to the horizontal line, then calculate the front-vehicle distance $d_1$ (or $d_2$) using Eq.(8) (or Eq.(14)).

B. Estimating the Vehicle Speed

We can use the above "detecting the distance to a front obstacle or vehicle" method to detect a terminal point of a dashed lane line of the current lane in a continuous image sub-sequence as one example shown in FIG. 5. For the images, the distances from the camera location to the terminal point are calculated respectively. The vehicle speed is just derived from the distance difference dividing by the time difference for the images.

C. Determining the Left/Right Location of the Vehicle in a Road Lane

If the optical axis of the camera is on the YZ-plane of the world coordinate system, then the vanishing point of the current lane must locate on the vertical central line of the image. The factor is independent to the left/right shift of the camera. In other words, only the camera coordinate system having a yaw rotation with respect to the world coordinate system can result in the factor that the vanishing point is not located on the vertical central line of the image.

Now we use an image as shown in FIG. 7 and a top-view diagram as shown in FIG. 8 to describe the relationship of the yaw rotation of the camera coordinate system and the lane lines. If c is the midpoint of the image lower border shown in FIG. 7; c is also shown in the current lane in the top-view diagram. In the image, we draw a line to link point c and the vanishing point; the drawn line is just the vehicle location line shown in FIG. 8. From the viewpoint of the 3-dimensional geometric meanings, the line is parallel to the lane lines. In the image, we can compute a distance ratio on any horizontal line located below the image center. We track a horizontal line from the vehicle location line to both lane lines to get two distances. The ratio of these two distances is invariant to the location of the horizontal line and the ratio is the same as the ratio of point c to both lane lines, L/R as shown in FIG. 7; moreover, the ratio is also the same as the ratio l/r shown in FIG. 8. Ratio l/r is just the distance ratio of the camera to the lane lines; ratio l/r is independent to the yaw rotation of the camera coordinate system. From the ratio, we can obtain the right/left location of the vehicle in the current lane.

If we know the vehicle width, we can judge whether the vehicle has deviated from the current lane and driven into the neighboring lane or has not. Assume that the lane width is $R_w$, the vehicle width is $V_w$, and the camera is fixed at the center of the windshield. If the ratio l/r is less than $V_w/(2R_w-V_w)$ or greater than $(2R_w-V_w)/V_w$, then the vehicle has deviated from the current lane.

SUMMARY OF THE INVENTION

As described about, the present invention is a monocular computer vision technique to aid road vehicle driving for safety. The technique uses a camera which is installed in a vehicle and faces to the road in front of the vehicle to capture a sequence of road/scene images to acquire the distance to a front obstacle or vehicle, the speed of the vehicle, and the left/right location of the vehicle in a road lane. If a danger situation arises, the sound and/or light alarm will arise to warn the driver for safety. The present invention utilizes the monocular computer vision technique to reduce the cost and provide multiple safety functions. The present technique is an advanced, practical, and novel invention. The above description is not intended to be limiting, however, the invention instead being defined by the appended claims.

What is claimed is:

1. A versatile monocular computer vision method of processing and analyzing a sequence of monocular road/scene images captured by a single monocular image capture device for aiding road vehicle driving; said method comprising the steps of:

i. by processing and analyzing the monocular road/scene images, detecting a distance to a front obstacle or front vehicle;

ii. by processing and analyzing the monocular road/scene images, calculating a vehicle direction relative to a lane direction;

iii. by processing an analyzing the monocular road/scene images, determining a left/right location of said vehicle in a road lane; and iv. estimating a speed of said vehicle, wherein said step of detecting a distance to a front obstacle or vehicle comprises the steps of:

a. from a sequence of road/scene images extracting two lane markings on both sides of said road lane and then finding an intersection point of said lane markings; said intersection point being a vanishing point of said road lane;

b. from said vanishing point and a known focal length of a lens of a camera, finding a pitch angle and a yaw angle of said lane markings with respect to a camera coordinate system;

c. from said pitch angle and a height of said camera, calculating a distance from a location of said camera to a point which is an intersection point of an optical axis of said camera and a road plane;

d. from said images, finding horizontal lines that indicate intersections of rear wheels of front vehicles and said road plane, selecting a nearest horizontal line that is in said road lane, and judging that said horizontal line is located above or below an image center;

e. from said known camera focal length, camera height, pitch angle, and a vertical distance from said horizontal line to said image center, finding said distance from said camera location to said rear wheel of said front vehicle or obstacle.

2. A versatile monocular computer vision method according to claim 1, wherein said vehicle direction relative to said lane direction is just said yaw angle of said lane markings with respect to said camera coordinate system.

3. A versatile monocular computer vision method of processing and analyzing a sequence of monocular road/scene images captured by a single monocular image capture device for aiding road vehicle driving; said method comprising the steps of:

i. by processing and analyzing the monocular road/scene images, detecting a distance to a front obstacle or front vehicle;

ii. by processing and analyzing the monocular road/scene images, calculating a vehicle direction relative to a lane direction;

iii. by processing an analyzing the monocular road/scene images, determining a left/right location of said vehicle in a road lane: and iv. estimating a speed of said vehicle, wherein said left/right location of said vehicle in said road lane is computed from the ratio of two distances which are from a midpoint of a said image lower border to two intersection points of said extended image lower border and said lane markings of said road lane.

4. A versatile monocular computer vision method of processing and analyzing a sequence of monocular road/scene images captured by a single monocular image capture device for aiding road vehicle driving; said method comprising the steps of:

i. by processing and analyzing the monocular road/scene images, detecting a distance to a front obstacle or front vehicle;

ii. by processing and analyzing the monocular road/scene images, calculating a vehicle direction relative to a lane direction;

iii. by processing an analyzing the monocular road/scene images, determining a left/right location of said vehicle in a road lane; and iv. estimating a speed of said vehicle, wherein said vehicle speed is computed based on a determination of said distance to a front vehicle; wherein a terminal point of a dashed lane marking is first found in said sequence of road/scene images; said distances from said camera location to said terminal point in said images are calculated respectively; and said vehicle speed is derived from a distance difference divided by a time difference.

* * * * *